Dec. 26, 1967 — W. S. MILLER — 3,360,218
VERTICAL TAKE-OFF AIRCRAFT
Filed June 14, 1965 — 2 Sheets-Sheet 1
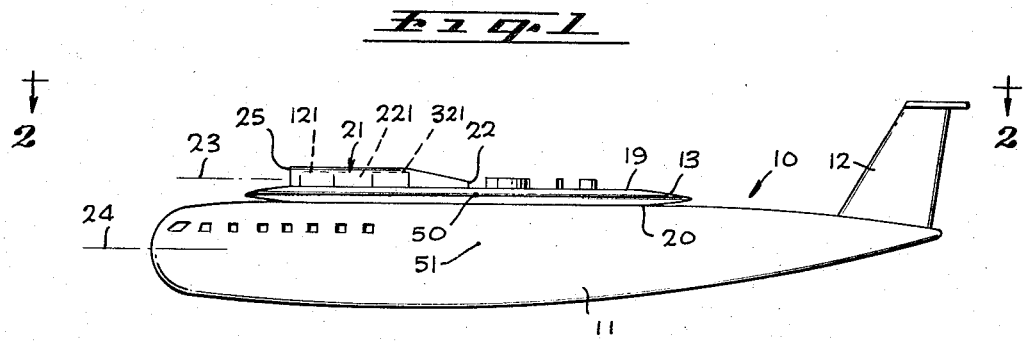
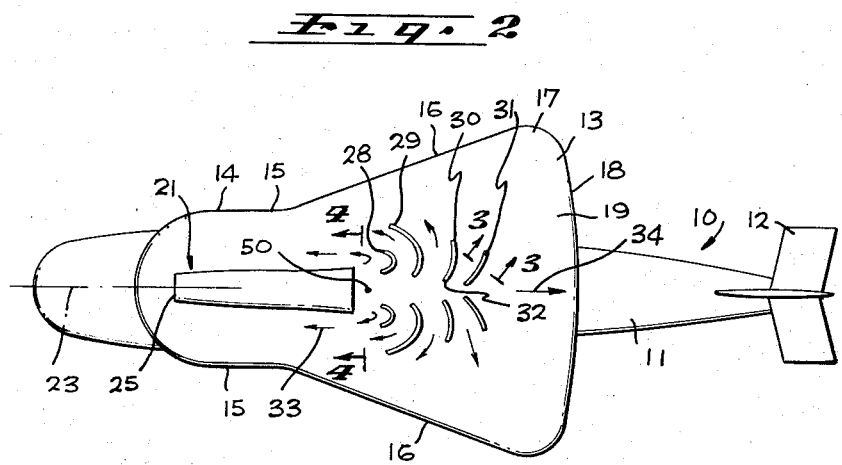
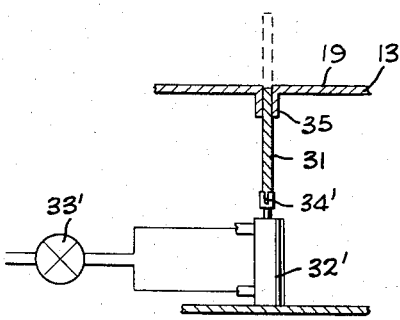
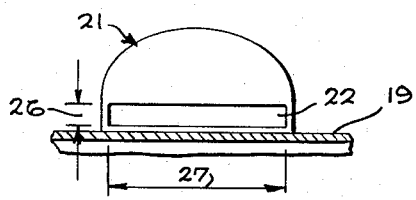
WENDELL S. MILLER
INVENTOR
BY William P. Green
ATTORNEY

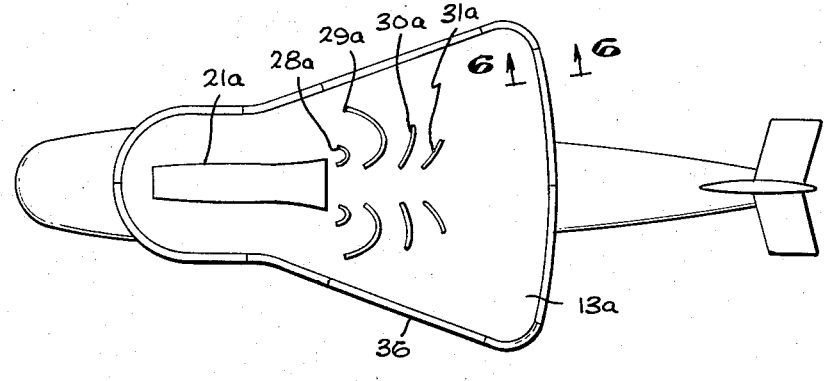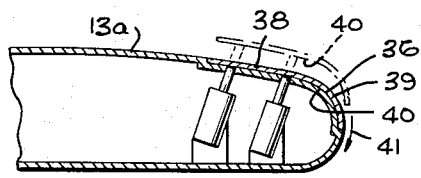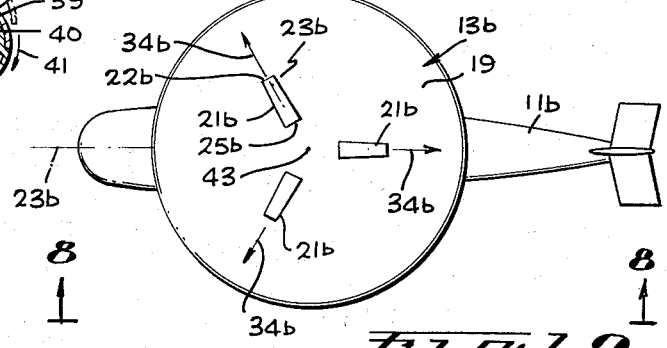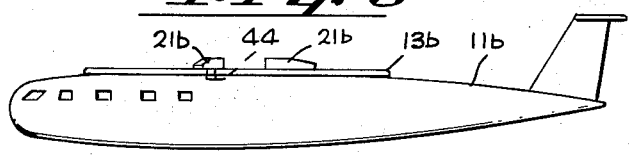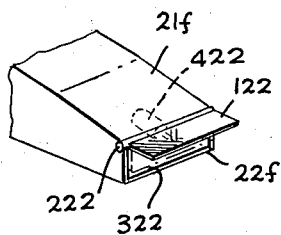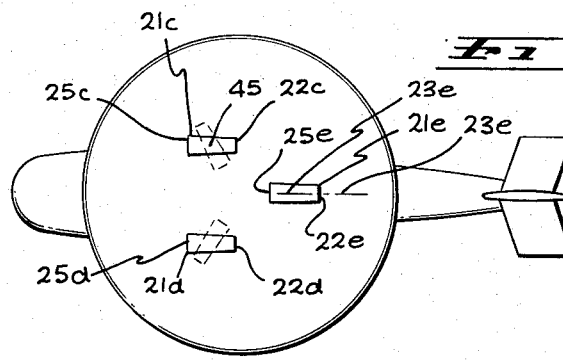

3,360,218
VERTICAL TAKE-OFF AIRCRAFT
Wendell S. Miller, 1341 Comstock Ave.,
Los Angeles, Calif. 90024
Filed June 14, 1965, Ser. No. 463,533
9 Claims. (Cl. 244—12)

ABSTRACT OF THE DISCLOSURE

A vertical take-off aircraft having a horizontally extending jet engine which directs its discharge gases rearwardly along the upper surface of a wing to produce both lift and forward motion of the craft, and having retractable deflectors which, in a vertical take-off or landing condition, direct the discharge gases in opposite directions to cancel out their horizontal thrust and produce only lift. At its periphery, the wing has additional deflectors directing the gases downwardly to increase the lift forces during take-off.

---

This invention relates to an improved type of aircraft which is characterized by a capacity for vastly increased lift as compared with conventional winged craft, so that the craft may rise much more abruptly than such conventional airplanes, and if desired may be adapted for directly vertical take-off and landing.

In recent years, great efforts have been made to devise an aircraft which is capable of vertical take-off and landing, in order to permit such take-off and landing in locations at which extended runways can not be provided, and also to reduce the hazards of take-off and landing. Several types of vertical take-off airplanes for this purpose have been devised and have actually been built. However, in each of these prior arrangements, it has been found necessary, in order to attain the desired vertical take-off feature, to introduce into the craft some type of structural complexity which has had one or more decided disadvantages. In some cases, the structure required to attain vertical take-off has greatly reduced the efficiency of the craft for conventional horizontal flight, thus rendering the craft completely impractical for actual operational use. Other proposals have required mechanism which has greatly increased the cost of the craft, or its upkeep, or has so complicated the handling of the aircraft and/or its criticality of construction as to overcome the advantages attained by the vertical take-off feature, and again preclude practical wide scale adoption of the principle.

The general object of the present invention is to provide an improved arrangement for maximizing the lift of an aircraft without relying on rapid forward travel of the wing of the craft through the air, so that the craft may take off on a short runway, or directly vertically if desired. Particularly contemplated is an arrangement which can produce the discussed increased lift in a structurally very simple system in which the vertical take-off feature does not detract in any way from the efficiency of the craft for horizontal travel in flight. As will appear, the craft may be very easily convertible from a take-off condition of maximum lift at little or no horizontal speed to a forward travel condition in which a maximum rate of horizontal motion is attained. In this forward travel condition, the craft can attain speeds as high as any conventional aircraft, with power requirements no greater than in conventional craft, and thus in spite of its vertical or abrupt take-off capacity is completely practical for either long or short range flights of any distance. An additional object is to allow for the attainment of lift in a manner which does not necessarily require a stream of air or gases to be directed downwardly toward the earth during take-off, and can thus avoid the tendency of many vertical take-off systems to stir up ground debris. Such circulation of debris is not only bothersome and inconvenient but may actually damage the engine or engines of the craft by feeding the debris into the engines with the intake air.

The structure utilized to attain the above discussed results includes a generally horizontal wing or wings, together with means for producing rapid movement of air or other gases along the upper surface of the wing at high velocity to produce a subatmospheric pressure above the wing, by virtue of the velocity of the gases, so that the atmospheric pressure beneath the wing applies an upward force or lift thereto. Preferably, the rapid movement of air is produced by one or more engines, desirably jet engines whose exhaust gases are directed along the upper surface of the wing as discussed to produce the lift.

An important feature of the invention resides in the special construction of the apparatus in a manner such that some or all of the horizontal reaction forces produced by the rapidly moving gases are in opposition to one another and therefore cancel out, to thus reduce or eliminate the horizontal forces exerted against the craft by the discharging gases, and thereby attain the rapid vertical take-off capability. More particularly, different portions of the rapidly moving gases may be aimed in different directions which have components in generally opposite horizontal directions, to attain the discussed partial or entire reaction force cancellation effect. For example, some of the gases may be discharged rearwardly from the craft, to produce a forward thrust, while others of the gases may be directed forwardly, to produce a counterbalancing rearward thrust. Similarly, equal or approximately equal portions of the gases may be deflected laterally toward the two opposite sides of the craft to produce partially or wholly counterbalancing lateral reaction thrusts.

In one form of the invention, the gas stream from a particular engine may initially tend to flow in a predetermined usually rearward direction, but be deflectible by appropriate deflector means in a manner such that the horizontal thrust of some of the gases is in opposition to the thrust of other portions of the gases. The deflector means may include a series of deflectors located in the path of the rearwardly moving gases and disposed at different angles to direct some of the discharge gases forwardly and some in opposite lateral directions, while permitting a remainder of the gases to flow directly rearwardly. After the craft has risen essentially vertically by the lift produced on the wing, while the horizontal reaction forces are partially or wholly cancelled out, the deflector means may be retracted to inactive positions in which they no longer deflect the gases but rather permit them to flow directly rearwardly over the wing to produce only forward thrust in conjunction with sufficient lift to maintain the craft in flight.

Another form of the invention utilizes a plurality of engines so constructed and located as to direct different streams of gases from the different engines respectively in several different directions to attain the desired horizontal thrust cancellation effect, while the lift resulting from the flow of the gases across the upper surface of the wing causes vertical take-off of the craft. After an airplane embodying this form of the invention has risen to a proper elevation, one or more of the engines may be turned off, or its gases may be directed differently, to terminate the cancellation effect and produce thrust in only a desired single direction, for maximum rate of forward travel.

In addition to the lift attained by motion of the gases across the upper surface of the wing, further lift may be achieved by deflecting the gases downwardly toward the earth, preferably by deflectors located at the periphery of the wing or wings. As in the case of the other deflectors, these deflectors may be retractible during normal horizontal flight to positions in which they are no longer effective to deflect the gases.

The above and other features and objects of the invention will be better understood from the following detailed description of the typical embodiments illustrated in the accompanying drawings, in which:

FIG. 1 is a side view of an aircraft constructed in accordance with the invention;

FIG. 2 is a plan view of the FIG. 1 craft, taken on line 2—2 of FIG. 1;

FIG. 3 is an enlarged fragmentary vertical section taken on line 3—3 of FIG. 2;

FIG. 4 is an enlarged fragmentary vertical section taken on line 4—4 of FIG. 4;

FIG. 5 is a plan view similar to FIG. 2, but showing a variational form of the invention;

FIG. 6 is an enlarged fragmentary vertical section taken on line 6—6 of FIG. 5;

FIG. 7 is a plan view of another form of the invention;

FIG. 8 is a side view of the FIG. 7 airplane taken on line 8—8 of FIG. 7;

FIG. 9 is a plan view of another form; and

FIG. 10 is a fragmentary perspective of another form of the invention.

Referring first to FIGS. 1 through 4, I have illustrated at 10 an airplane constructed in accordance with the invention and having a fuselage typically represented at 11. This fuselage may have a conventional tail and rudder structure 12, and may have conventional landing gear which has not been represented in the figures.

To the upper side of fuselage 11, there is mounted a generally horizontal wing 13, which in vertical section may have an appropriate air foil configuration as illustrated in FIG. 1. As seen in plan view, the wing 13 may have the configuration illustrated in FIG. 2, to include a forward relatively narrow portion 14 defined by two opposite generally parallel horizontally extending side edges 15, which flare or diverge progressively apart as they extend rearwardly at 16 to form a gradually widening rear portion 17 of the wing. The rear edge 18 of the wing may have the curvature represented in FIG. 2.

This wing has an upper approximately horizontal surface 19 extending across the entire area of the wing, and has a generally parallel and essentially horizontal undersurface 20. The wing is connected rigidly in any suitable manner to fuselage 11, at the center of its undersurface 20.

On the upper side of wing 13 there is mounted a jet engine 21, which may be of conventional construction except as to the shape of its rear gas discharge outlet opening 22. The front to rear axis 23 of the engine extends parallel to, and may be directly above, the front to rear axis 24 of fuselage 11. At its forward end 25, the jet engine 21 has the usual air inlet opening, facing forwardly (to the left in FIGS. 1 and 2), to receive air which passes through the engine. Within the engine, the air is compressed by the usual compressor 121, jet fuel is burned within a burning chamber 221, and the gases of combustion mix with the air and pass rearwardly through and drive an axial flow turbine 321. As will be understood, the compressor is driven rotatively by the turbine, with both of these units turning rapidly about the horizontal axis 23 of the engine. After passing through the turbine, the high temperature gases are emitted as a high velocity jet through outlet opening 22. The outlet 22 is preferably of horizontally elongated configuration (see FIG. 4), and extends closely adjacent the upper surface 19 of the wing, and has a vertical dimension 26 which is very small as compared with its horizontal dimension 27, to shape the discharged gases into a vertically relatively thin but wide sheet or layer of such gases, tending to follow closely the upper surface 19 of the wing as the gases advance rearwardly. As will be apparent from FIGS. 1 and 2, the outlet 22 desirably lies in a plane which is disposed directly transversely of axis 23 of the engine.

Rearwardly of outlet 22 of the jet engine 21, there are provided at the upper side of wing 13 a series of deflectors typically represented in FIG. 2 as four pairs of such deflectors 28, 29, 30 and 31. The deflectors of each of these pairs have their inner ends 32 so located as to intercept a portion of the rearwardly moving gases from jet engine outlet 22, and deflect those gases laterally rather than permitting them to continue their directly rearward motion. Each of the deflectors 28, 29, 30 and 31 may extend directly vertically upwardly perpendicular to upper surface 19 of the wing, and may have the curvature represented in FIG. 2. For example, the first pair of deflectors 28 may be shaped as shown to form return curves, acting to deflect portions of the rearwardly moving gases first laterally and then forwardly, to emit in a forward direction from the deflectors 28 in the directions indicated by arrows 33. The second pair of deflectors 29 may similarly deflect equal portions of the rearwardly moving gases laterally in opposite directions and then forwardly or generally forwardly. The next pair of deflectors 30 may direct the gases more in opposite lateral directions, as may be the case also with the final deflectors 31. Some of the gases may pass entirely through the series of deflectors, to discharge rearwardly as indicated by the arrow 34. As will be apparent from FIG. 2, the two sets of deflectors, at opposite sides of center line 23 of the jet engine, are symmetrical with respect to the center line, and with respect to a vertical plane extending along the axis of the jet engine, so that the same amount of gases are deflected laterally and forwardly at one side of the center line as are deflected laterally and forwardly at the opposite side, with the lateral reaction thrusts being exactly balanced.

Each of the deflectors 28, 29, 30 and 31 is mounted for retraction downwardly, from its active position in which it projects upwardly above upper wing surface 19 (broken line position of FIG. 3) to a retracted position (full line position of FIG. 3) in which the deflector is contained within the interior of wing 13. The retracting mechanism is illustrated diagrammatically in FIG. 3 for only one of the deflectors, but may be the same for all of the other deflectors. This mechanism is illustrated as including a piston and cylinder unit 32', which is hydraulically or pneumatically actuated by a reversing valve represented at 33' to elevate and lower the deflector, which may be connected at 34' to the piston rod of mechanism 32'. The deflector may be guided for its retracting movement in any convenient manner, as for instance by a guide way 35 formed in the wing. The various piston and cylinder mechanisms 32' for the different pairs of deflectors 28, 29, 30 and 31 may be under the control of separate valves 33', so that different ones of the deflector pairs may be lowered or raised individually.

To now describe the operation of the arrangements of FIGS. 1 through 4, assume first of all that the craft is at rest on the ground, and it is desired to perform a vertical take-off. To attain this result, all of the deflectors 28, 29, 30 and 31 are actuated to their upwardly projecting active positions (broken lines of FIG. 3), and the jet engine 21 is then started to commence the rearward emission of high velocity discharge gases rearwardly along axis 23 (to the right as viewed in FIGS. 1 and 2). These gases are deflected laterally and forwardly by the various pairs of deflectors 28, 29, 30 and 31 in the manner discussed previously, but with the gases as thus directed remaining closely adjacent the upper surface 19 of the wing as the different portions of the gas stream flow in different directions. The rapid movement of these gases along the upper surface of the wing produces a reduced subatmospheric pressure above the wing, which in conjunction with the atmospheric pressure beneath the wing causes a lift moving the wing and fuselage directly vertically upwardly from the earth. The deflectors 28, 29, 30 and 31 are preferably so constructed and/or adjusted as to approximately, and desirably completely, cancel out all horizontal reaction thrust produced by the gases, so that there is no tendency for horizontal motion of the craft as it moves upwardly. More specifically, the gases which are deflected forwardly by the deflectors are in a quantity such that their rearward thrust exactly counterbalances the forward thrust resulting from the portion of the gases which emit rearwardly from the wing. Similarly, the gases which are deflected rightwardly are in a quantity exactly equal to and counterbalancing the leftwardly moving gases, so that there is no lateral, forward, or rearward reaction thrust. Alternatively, one or more of the pairs of deflectors may be retracted during take-off in a manner such that a net forward thrust is attained, so that the craft may move slowly forwardly as it takes off.

After the craft has reached a desired elevation, the deflectors 28, 29, 30 and 31 are retracted downwardly into the interior of the wing, so that all of the gases are thereafter discharged directly rearwardly across the upper surface of the wing, without lateral deflection, to produce a maximum forward thrust tending to drive the craft through the air at great velocity, with adequate lift being provided by the motion of the gases over the upper surface of the wing. Because of the fact that the discharge gases are thus forced across the top surface of the wing even in forward flight, the area of wing 13 may be substantially smaller than the overall area of the wing of a conventional craft having equal lifting capacity, and the reduction in size of the wing may enable considerably increased forward speeds for an engine of given horsepower. In order to prevent too abrupt a conversion from vertical to horizontal travel, the four pairs of deflectors may be retracted sequentially, to gradually increase the forward thrust on the craft. When it is desired to land, the deflectors may similarly be actuated to their upper active positions sequentially, to gradually cancel out the forward driving thrust and return the craft to the initial condition in which only lift is produced by the jet engine 21, following which the rate of operation of that engine may be slowly reduced to allow the craft to gradually settle downwardly to a landing location.

FIGS. 5 and 6 represent a second form of the invention which may be considered as identical with that of FIGS. 1 to 4 except as to provision of the series of additional deflectors 36 which extend about the periphery of wing 13a, and are capable of deflecting the laterally moving gases downwardly toward the earth as they reach the edge of the wing. Each of the deflectors 36 may have the vertical cross-section illustrated in FIG. 6, and be actuable by appropriate shifting means between the full line retracted position of FIG. 6 and the broken line active position. For shifting the deflectors 36, I have typically illustrated in FIG. 6 a plurality of piston and cylinder units, which are hydraulically or pneumatically energized to power shift the deflectors between their illustrated settings. Each of the deflectors 36 may have a generally horizontal portion 38, which gradually curves downwardly at 39, to form a curving inner surface 40 along which the gases flow first outwardly and then downwardly, to discharge toward the earth in the downward direction indicated by arrow 41 of FIG. 6. The deflectors 36 may together extend entirely about the periphery of the wing 13a, having the cross-section illustrated in FIG. 6 at all points about that periphery, and being interrupted only at such locations 42 as are necessary or desirable to enable formation of the deflectors in segments meeting at those locations 42.

In using the aircraft of FIGS. 5 and 6, the engine 21a and deflectors 28a, 29a, 30a and 31a are all utilized in the same manner discussed in connection with the corresponding portions of the first form of the invention. In addition, during take-off, the deflectors 36 are actuated to their broken line active positions of FIG. 6, to deflect the gases downwardly as they reach the periphery of the wing, and thereby produce a superatmospheric pressure beneath the wing acting to increase the lift resulting from the subatmospheric pressure developed above the wing.

FIGS. 7 and 8 illustrate another form of the invention in which the cancellation of horizontal reaction forces is attained by the provision of a plurality of differently directed jet engines 21b, mounted to the upper surface 19b of a wing 13b, which in FIG. 7 is typically illustrated as being of circular configuration. This wing 13b carries a fuselage 11b at its underside. While any desired number of the jet engines 21b may be employed, it is contemplated that three such engines may give optimum results, with their axes 23b extending radially outwardly from a common center point 43, at evenly circularly spaced locations. The inlet ends 25b of the three engines may face inwardly toward center 43, while the discharge gases may be directed along axes 23b and away from center 43 as indicated by arrows 34b. These gases move rapidly over the upper surface of a substantial portion of the wing, to produce lift in the manner discussed previously, but with the horizontal thrusts all cancelling out by reason of the uniform circular spacing of the discharge ends of the engines. As in the first form of the invention, the outlets 22b of the engines may have the horizontally elongated configuration illustrated in FIG. 4, closely adjacent the upper surface of the wing, to maximize the lifting effect attained.

After the craft of FIGS. 7 and 8 has taken off vertically and attained a desired height, the two laterally and forwardly directed engines 21b may be turned off, with only the third engine thereafter being operated, so that all of the gases are discharged rearwardly to produce only a forward thrust tending to cause rapid forward motion of the craft. During landing, the other two engines are again energized to balance out the horizontal reaction forces and allow directly vertical landing of the craft.

FIG. 9 is a view similar to FIG. 7, showing a craft having three engines 21c, 21d and 21e which in one condition assume the positions of engines 21 of FIG. 7, but which in the forward travel condition are adapted to swing to the full line positions of FIG. 9 so that all of the engines may produce forward thrust in additive fashion. More particularly, the engine 21e of FIG. 9 may have its inlet end at 25e and its discharge end at 22e, so that its axis 23e always extends parallel to the main front to rear axis of the craft. The other two engines 21c and 21d may during take-off assume the broken line positions of FIG. 9, corresponding to the positions of the two front engines 21b of FIG. 7, and may be mounted by a suitable hinge mounting or other swinging mounting structure typically represented at 44 to swing about vertical axes 45 to the full line positions of FIG. 9, in which the intake ends 25c and 25d of engines 21c and 21d face directly forwardly, and their outlet ends 22c and 22d face directly rearwardly, so that all of the three engines have their axes aligned in a precisely front to rear direction, and the gases produced by all engines emit directly rearwardly to produce a very high reaction force causing forward motion of the craft. In each position of each engine the outlet ends are closely adjacent the wing surface, and are of the horizontally elongated shape illustrated in FIG. 4, to produce a thin sheet of gases moving along the upper surface of the wing in a manner maximizing the lift attained.

FIG. 10 illustrates a change which may be made in the FIGS. 1–4 form of the invention, so that the rear discharge outlet 22f of the jet engine 21f (corresponding to outlet 22 of the FIG. 1 engine 21) may be increased in vertical height during forward travel of the craft. For this purpose, outlet 22f may be of the increased height illustrated in FIG. 10, and may be partially closable during vertical travel by a vane or closure which is somewhat diagrammatically illustrated at 122. This closure may typically be hinged by a shaft 222 for swinging movement between the full line open position, in which gases may pass rearwardly through opening 22f across its entire cross section (up to the height of shaft 222) and the downwardly projecting broken line position in which only a narrow horizontally extending lower portion 322 of the opening 22f, of a size corresponding to outlet 22 of FIG. 4, is open. Thus, the engine may direct its gases in close proximity to the wing surface during take-off and landing, but may have less restricted and more open discharge of the gases during forward travel. The closure 122 may be power actuable between its open and closed positions by an appropriate hydraulic or other power mechanism which is diagrammatically represented at 422, and is suitably under the control of the pilot.

In each of the various forms of the invention, the wings, fuselage, engines and other portions of the craft are, for stability, preferably so constructed and positioned that the overall center of lift of the wing and other related components is essentially (desirably exactly) aligned vertically with the center of gravity of the aircraft, and is preferably above that center of gravity. For instance, in FIGS. 1 and 2, the center of lift may be at the point 50, and the center of gravity may be directly beneath that point at 51. The relationships defined in this paragraph should be maintained in the vertical travel condition of the craft (when vanes 28a through 31a are elevated) and also in the horizontal travel condition when the vanes are retracted.

Up to this point in the present description, each of the forms of the invention has been described as though the lift produced at one side of the front to rear center line or plane of the craft exactly balanced the lift produced at the opposite side. This is of course true when directly vertical movement of the craft is desired. However, it is contemplated that the lift at the opposite sides of the craft may in some instances be purposely unbalanced, to apply a greater lift to one side of the craft than the other, as for instance for the purpose of raising one side of the craft relative to the other to attain a banking position. For this purpose, in the first form of the invention as an example, the piston and cylinder mechanisms 32' of FIG. 3 and their control valves 33' may be separately actuated in a manner enabling elevation and lowering of one or more of the deflectors 28, 29, 30 and 31 at a first side of the craft, without corresponding elevation or lowering of the corresponding deflector or deflectors at the opposite side of the craft. Thus, controllably different unbalanced lift forces may be produced at opposite sides of the center line of the craft, and at the same time controllably different and unbalanced lateral thrust may be produced by adjusting the deflectors to different unbalanced conditions. Similarly, the gas flow producing mechanisms of the other forms of the invention may be designed for actuation to conditions in which the lift and lateral thrust are different at one side of the craft than at the other, for banking purposes, inducing lateral movement of the craft, and for any other desired purposes attainable in this manner.

I claim:

1. An aircraft including a fuselage having wing means and constructed to travel horizontally in a predetermined forward direction, jet engine means extending generally horizontally and having compressor means and turbine means turning about a generally horizontal front to rear axis, said engine means having air inlet means, and having gas outlet means facing essentially rearwardly for directing high velocity gases rearwardly to cause forward movement of the aircraft, deflector means retractably positionable in the path of said rearwardly moving discharge gases and operable to deflect said gases so that different portions of the gases flow along the upper surfaces of said wing means in different horizontal directions having generally opposed horizontal components in a relation such that said gases apply lift to the craft but the horizontal reaction forces of said different portions at least partially counteract one another, and means for actuating said deflector means between an active position for deflecting said gases and a retracted position for forward travel.

2. An aircraft as recited in claim 1, in which said deflector means are operable to deflect said gases in directions in which approximately all horizontal reaction forces produced by the gases are cancelled out and the craft is elevated by said lift substantially directly vertically.

3. An aircraft as recited in claim 1, in which said deflector means are constructed and positioned to deflect different portions of said rearwardly moving gases in opposite lateral directions.

4. An aircraft as recited in claim 1, in which said deflector means are constructed and positioned to deflect different portions of said rearwardly moving gases in opposite lateral directions and to turn some of said gases through essentially 180 degrees to discharge forwardly and produce a rearward thrust.

5. An aircraft as recited in claim 1, in which said gas outlet means form an opening through which said gases discharge from said engine means, and which opening is closely adjacent said wing means and is elongated horizontally but of relatively smaller vertical height to produce a vertically thin layer of gases moving along the upper surface of the wing means across a wide area thereof.

6. An aircraft including wing means, engine means operable to produce rapid movement of gases generally horizontally along the upper surface of said wing means to apply lift thereto, deflector means constructed to deflect portions of said gases in directions having horizontal components which are generally opposed to horizontal components of other portions of the gases in a relation such that horizontal reaction forces of said different portions at least partially counteract one another, said deflector means being free for movement between an active position of projection essentially upwardly from the wing means and a downwardly retracted position essentially within said wing means.

7. An aircraft including an essentially horizontal wing having a narrow forward portion and a rear portion which widens progressively as it extends rearwardly, a jet engine mounted at the upper side of said forward narrow portion of the wing and having a gas discharge opening facing rearwardly and operable to produce rapid movement of discharge gases from the jet engine generally horizontally along the upper surface of said progressively widening rear portion of the wing to apply lift thereto, retractable deflector means at the upper side of said wing constructed to deflect portions of said gases in opposite lateral directions and forwardly while some gases travel rearwardly so that the horizontal reaction forces of said gases are at least partially cancelled out, and retracting means for shifting said deflector means between an active position for deflecting said gases to cause opposition of their reaction forces and a retracted position in which approximately all of the gases flow in the same horizontal direction and their horizontal reaction forces are additive for forward travel.

8. An aircraft as recited in claim 7, including additional deflector means extending along the periphery of said wing and actuable between an active position for deflecting said gases downwardly to attain additional lift, and a retracted position in which said gases are free to discharge horizontally from the periphery of the wing.

9. An aircraft including an essentially horizontal wing having a narrow forward portion and a rear portion which widens progressively as it extends rearwardly, a jet engine mounted at the upper side of said wing and having a gas discharge opening facing rearwardly and operable to produce rapid movement of discharge gases from the jet engine generally horizontally along the upper surface of said progressively widening rear portion of the wing to apply lift thereto, and means operable to direct portions of said gases in opposite lateral directions so that their horizontal reaction forces at least partially cancel out, said means being actuable between a first condition for directing said gases laterally and an inactive condition in which the gases flow rearwardly.

References Cited

UNITED STATES PATENTS 3,181,811   5/1965   Maksim _____ 244—12
3,237,888   3/1966   Willis _____ 244—23

MILTON BUCHLER, *Primary Examiner.*

ALFRED E. CORRIGAN, *Examiner.*

B. BELKIN, *Assistant Examiner.*